United States Patent
Zhu

(10) Patent No.: US 10,656,728 B2
(45) Date of Patent: May 19, 2020

(54) INFORMATION PROCESSING METHOD AND ELECTRONIC DEVICE

(71) Applicant: Lenovo (Beijing) Co., Ltd., Haidian District, Beijing (CN)

(72) Inventor: Siming Zhu, Beijing (CN)

(73) Assignee: LENOVO (BEIJING) CO., LTD., Haidan District, Beijing (CN)

( * ) Notice: Subject to any disclaimer, the term of this patent is extended or adjusted under 35 U.S.C. 154(b) by 226 days.

(21) Appl. No.: 14/964,127

(22) Filed: Dec. 9, 2015

(65) Prior Publication Data

US 2017/0031462 A1 Feb. 2, 2017

(30) Foreign Application Priority Data

Jul. 28, 2015 (CN) .......................... 2015 1 0450974

(51) Int. Cl.
*G06F 3/023* (2006.01)
*G06F 3/0489* (2013.01)
*G06F 3/0488* (2013.01)

(52) U.S. Cl.
CPC .......... *G06F 3/0238* (2013.01); *G06F 3/0489* (2013.01); *G06F 3/04886* (2013.01)

(58) Field of Classification Search
CPC ... G06F 3/0238; G06F 3/04886; G06F 3/0489
See application file for complete search history.

(56) References Cited

U.S. PATENT DOCUMENTS

2003/0120997 A1* 6/2003 Saito ....................... G06F 3/023
714/813

2004/0066374 A1* 4/2004 Holloway ............. G06F 3/0238
345/168

(Continued)

FOREIGN PATENT DOCUMENTS

| CN | 1707407 | 12/2005 |
|---|---|---|
| CN | 102292695 A | 12/2011 |
| CN | 103576890 | 2/2014 |

OTHER PUBLICATIONS

First Office Action dated Sep. 5, 2017 (15 pages including English translation) out of Chinese priority Application No. 201510450974.4.

(Continued)

*Primary Examiner* — William Boddie
*Assistant Examiner* — Saifeldin E Elnafia
(74) *Attorney, Agent, or Firm* — Brinks Gilson & Lione; John C. Freeman

(57) ABSTRACT

An information processing method and an electronic device are described. The method is applied to an electronic device. The method includes detecting an operation performed via a keyboard; determining which keys on the keyboard the operation is addressed to, the keys including ordinary keys, a first dedicated key, and a second dedicated key, wherein when the second dedicated key and each of the ordinary keys are simultaneously operated, a predetermined function corresponding to an associated ordinary key is performed, respectively; and when a determination result indicates that the operation includes an operation addressed to the first dedicated key and one of the ordinary keys, a predetermined function executed corresponding to that the second dedicated key and the ordinary key are simultaneously operated is executed.

10 Claims, 4 Drawing Sheets

(56) References Cited

U.S. PATENT DOCUMENTS

| | | | | |
|---|---|---|---|---|
| 2006/0017711 A1* | 1/2006 | Pihlaja | ............... | G06F 1/1626 |
| | | | | 345/173 |
| 2009/0213081 A1* | 8/2009 | Case, Jr. | ............... | G06F 1/1616 |
| | | | | 345/173 |
| 2011/0276528 A1 | 11/2011 | Shioiri | | |
| 2011/0280641 A1* | 11/2011 | Jiang | ............... | G06F 3/0213 |
| | | | | 400/486 |
| 2012/0289336 A1* | 11/2012 | Matsuda | ............... | G06F 3/0219 |
| | | | | 463/37 |

OTHER PUBLICATIONS

Second Office Action dated May 30, 2018 (18 pages including English translation) out of Chinese priority Patent Application No. 201510450974.4.

* cited by examiner

INFORMATION PROCESSING METHOD AND ELECTRONIC DEVICE

This application claims priority to Chinese Patent Application No. 201510450974.4 filed on Jul. 28, 2015, the entire contents of which are incorporated herein by reference.

The present application relates to an information processing method and an electronic device.

BACKGROUND

At present, keyboard input is still the most important information input manner. However, in notebook computers, since manufacturers have no uniform standards, there are no fixed positions for setting dedicated function keys such as Fn, Ctrl key. This results in that users often mis-operate when using the keyboard to operate, due to habit or unfamiliar reasons.

For example, as shown in FIG. 1a, in a keyboard used for a desktop computer, the Ctrl key is arranged in the leftmost position, the Fn key is arranged in the second position next to it. In addition, as shown in FIG. 1b, in a keyboard used for a notebook computer, for example, the Fn key is arranged in the leftmost position, the Ctrl key is arranged in a second position next to it. Therefore, when users who get used to the desktop computer use the keyboard of the notebook computer to make an input, they may mis-operate the Fn key with regard to the most common operations (such as Ctrl+C or Ctrl+V), and when the users are about to use the Fn key plus a predetermined function key to perform a functional operation, the users often mis-operate the Ctrl key, thereby it impossible to operate properly.

For this reason, it is desired to provide an information processing method and an electronic device capable of, based on combination of respective keys operated by the users when making an input, adaptively adjusting functions of the dedicated function keys for proper input, thereby providing user experience.

SUMMARY

According to an embodiment of the present application, there is provided an information processing method, the method comprising: detecting an operation performed via a keyboard; determining which keys on the keyboard the operation is addressed to, the keys including ordinary keys, a first dedicated key, and a second dedicated key, wherein when the second dedicated key and each of the ordinary keys are simultaneously operated, a predetermined function corresponding to an associated ordinary key is performed, respectively; and when a determination result indicates that the operation includes an operation addressed to the first dedicated key and one of the ordinary keys, a predetermined function executed corresponding to that the second dedicated key and the ordinary key are simultaneously operated is executed.

The keyboard further includes function keys with predetermined definitions, when the first dedicated key and each of the function keys are simultaneously operated, a predetermined function corresponding to an associated function key is executed, respectively. The method further comprising: when the determination result indicates that the operation includes an operation addressed to a function key with predetermined definitions and the first dedicated key, a function corresponding to the function key is executed.

The method further comprises: when the determination result indicates that the operation includes an operation addressed to the function keys with predetermined definitions and the second dedicated key, a function corresponding to that the first dedicated key and each function key are operated simultaneously, i.e., a function corresponding to the function key, is executed.

The method further comprises: when the determination result indicates that the operation includes an operation addressed to an ordinary key and the second dedicated key, a predetermined function executed corresponding to that the second dedicated key and the ordinary key are operated simultaneously is executed.

The first dedicated key may be a Fn key on the keyboard, and the second dedicated key may be a Ctrl key on the keyboard.

The keyboard may be a soft keyboard.

According to another embodiment of the present application, there is provided an electronic device, comprising: a keyboard on which a plurality of keys are provided, the plurality of keys including ordinary keys, a first dedicated key, and a second dedicated key, wherein when the second dedicated key and each of the ordinary keys are simultaneously operated, a predetermined function corresponding to an associated ordinary key is performed, respectively; and a control unit configured to detect an operation performed via the keyboard, determine which keys on the keyboard the operation is addressed to, and when a determination result indicates that the operation includes an operation addressed to the first dedicated key and one of the ordinary keys, execute a predetermined function corresponding to that the second dedicated key and the ordinary key are simultaneously operated.

The keyboard further includes function keys with predetermined definitions, when the first dedicated key and each of the function keys are simultaneously operated, a predetermined function corresponding to an associated function key is executed, respectively. The control unit is further configured to: when the determination result indicates that the operation includes an operation addressed to a function key with predetermined definitions and the first dedicated key, execute a function corresponding to the function key.

The control unit is further configured to: when the determination result indicates that the operation includes an operation addressed to the function keys with predetermined definitions and the second dedicated key, execute a function corresponding to that the first dedicated key and each function key are operated simultaneously, i.e., a function corresponding to the function key.

The control unit is further configured to: when the determination result indicates that the operation includes an operation addressed to an ordinary key and the second dedicated key, execute a predetermined function executed corresponding to that the second dedicated key and the ordinary key are operated simultaneously.

The first dedicated key may be a Fn key on the keyboard, and the second dedicated key may be a Ctrl key.

The keyboard may be a soft keyboard.

Accordingly, the information processing method and the electronic device according to the embodiments of the present application are capable of, based on combination of respective keys operated by the users when making an input, adaptively adjusting functions of the dedicated function keys for proper input, thereby providing user experience.

DETAILED DESCRIPTION

Hereinafter, the information processing method and the electronic device according to the embodiments of the present application will be described in detail with reference to the accompanying drawings.

First Embodiment

Figure 1A:
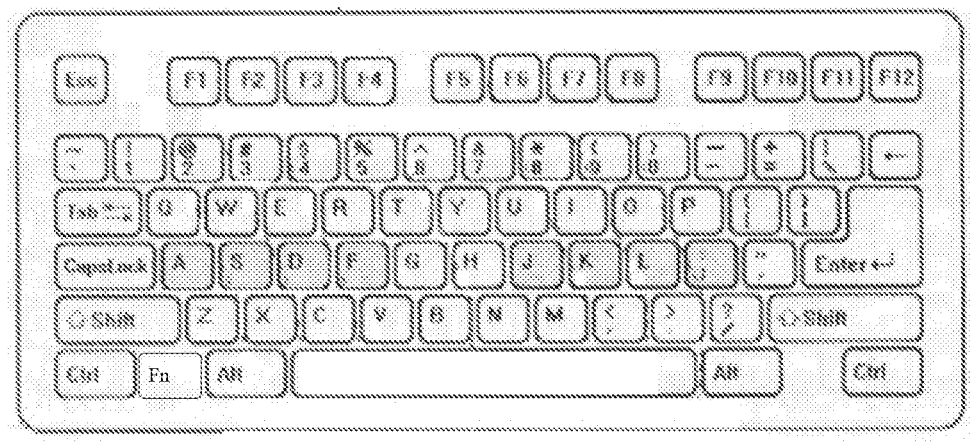
FIGS. 1a and 1b are diagrams used to explain layout of a common keyboard.
Figure 1B:
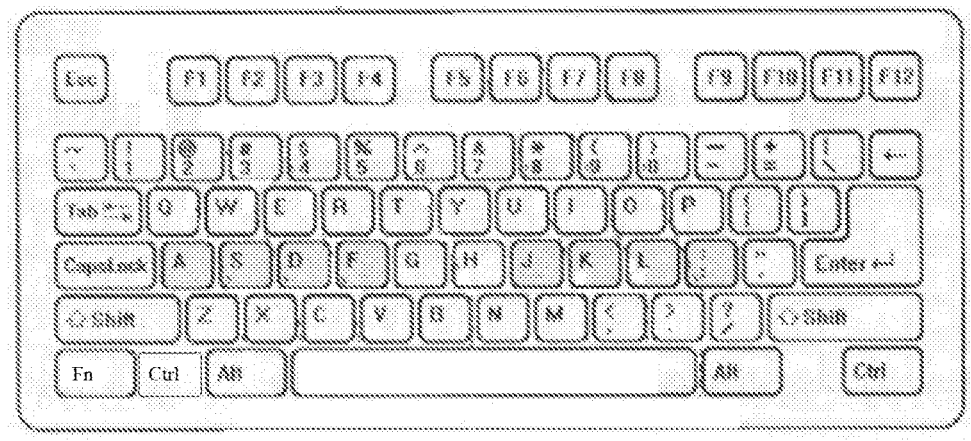
Figure 2:
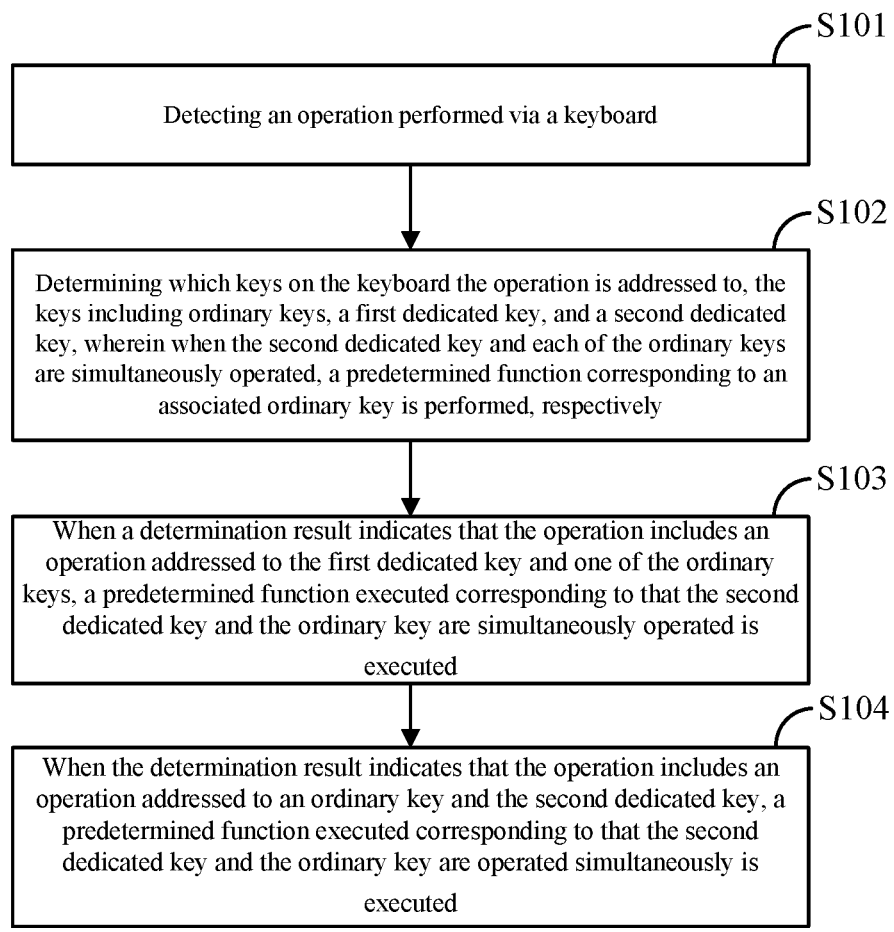
FIG. 2 is a flowchart illustrating an information processing method according to a first embodiment of the present application.

FIG. 2 is a flowchart illustrating an information processing method according to a first embodiment of the present application. The information processing method 100 according to the first embodiment of the present application is applied to an electronic device, the electronic device may be an arbitrary electronic device, so long as it has an input unit like a keyboard. For example, the electronic device may be a desktop computer, a notebook computer, a Tablet computer and so on. Also, it should be noted that the keyboard which the present application relates to is not necessarily a physical keyboard, for example, the information processing method of the present application may be also applied to a soft keyboard displayed on the Tablet computer.

The information processing method 100 according to the first embodiment of the present application comprises:

step S101: detecting an operation performed via a keyboard;

step S102: determining which keys on the keyboard the operation is addressed to, the keys including ordinary keys, a first dedicated key, and a second dedicated key, wherein when the second dedicated key and each of the ordinary keys are simultaneously operated, a predetermined function corresponding to an associated ordinary key is performed, respectively;

step S103: when a determination result indicates that the operation includes an operation addressed to the first dedicated key and one of the ordinary keys, a predetermined function executed corresponding to that the second dedicated key and the ordinary key are simultaneously operated is executed; and step S104; when the determination result indicates that the operation includes an operation addressed to an ordinary key and the second dedicated key, a predetermined function executed corresponding to that the second dedicated key and the ordinary key are operated simultaneously is executed.

In particular, the keys on the keyboard may for example include ordinary keys, a first dedicated key, and a second dedicated key, wherein when the second dedicated key and each of the ordinary keys are simultaneously operated, a predetermined function corresponding to an associated ordinary key is performed, respectively. For example, the first dedicated key is the Fn key on the keyboard and the second dedicated key is the Ctrl key thereon. As well known by those skilled in the art, when the second dedicated key, Ctrl key, and each letter key are simultaneously operated, each predetermined function defined in advance can be executed. For example, Ctrl key+C is a copy function, Ctrl key+V is a paste function, and so on.

In step S101, first, an operation performed via a keyboard is detected. In this step, if a physical keyboard is used, then pressing on the physical keyboard may be detected. If a soft keyboard is used, then a click operation performed by the user may be detected via a touch screen.

Thereafter in step S102, it is determined which keys on the keyboard the operation is addressed to. As described above, the keyboard includes ordinary keys, a first dedicated key, and a second dedicated key. Thus in this step, it is determined which keys on the keyboard a user input operation is addressed to.

Next, in step S103, when a determination result indicates that the operation includes an operation addressed to the first dedicated key and one of the ordinary keys, a predetermined function executed corresponding to that the second dedicated key and the ordinary key are simultaneously operated is executed.

In other words, because a combination operation of the first dedicated key (i.e., Fn key) and an ordinary key cannot execute a predetermined function corresponding to the ordinary key, it can be thereby determined that this operation of the user is a mis-operation. That is to say, it can be determined that the operation that the user intends to perform is a combination operation of the second dedicated key (i.e., Ctrl key) and the ordinary key.

Thus, in step S103, when it is determined that the user performs a combination operation of the first dedicated key and an ordinary key, for example, the user performs a combination operation of the first dedicated key Fn and an ordinary key C, function of the first dedicated Fn and that of the second dedicated key Ctrl are automatically switched, thus the combination operation of the second dedicated key Ctrl and the ordinary key C is performed, thereby executing the copy function.

On the other hand, in step S104, when the determination result indicates that the operation includes an operation addressed to an ordinary key and the second dedicated key, a predetermined function executed corresponding to that the second dedicated key and the ordinary key are operated simultaneously is executed.

In other words, when it is determined that the user performs a combination operation of the second dedicated key Ctrl and the ordinary key C, the combination operation of the second dedicated key Ctrl and the ordinary key C is normally performed, thereby executing the copy function.

Accordingly, the information processing method according to the first embodiment of the present application is capable of, based on combination of respective keys operated by the users when making an input, adaptively adjusting functions of the dedicated function keys for proper input, thereby providing user experience.

Second Embodiment

Figure 3:
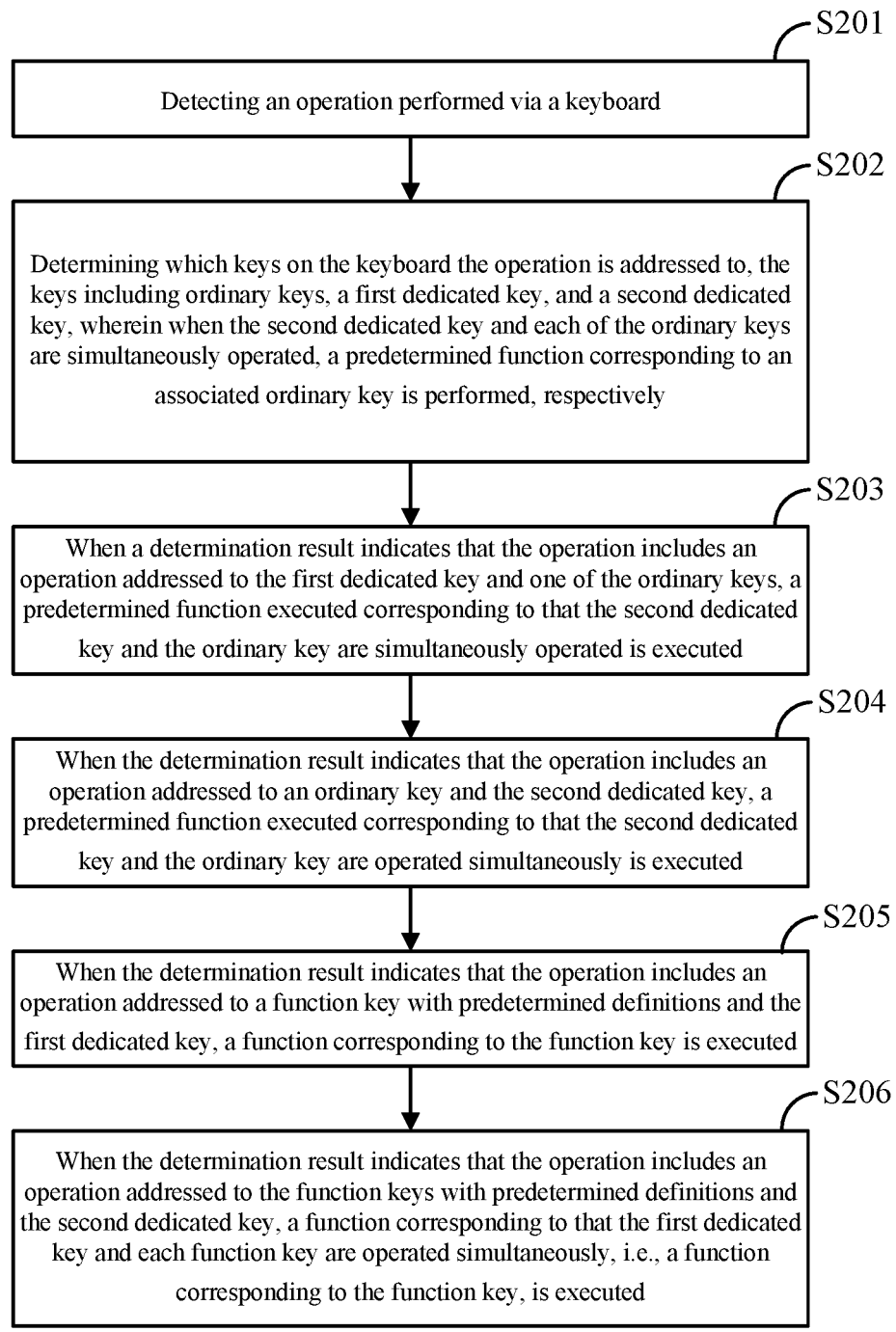
FIG. 3 is a flowchart illustrating an information processing method according to a second embodiment of the present application.

FIG. 3 is a flowchart illustrating an information processing method according to a second embodiment of the present application. The information processing method 200 according to the second embodiment of the present application is applied to an electronic device, the electronic device may be an arbitrary electronic device, so long as it has an input unit like a keyboard. For example, the electronic device may be a desktop computer, a notebook computer, a Tablet computer and so on. Also, it should be noted that the keyboard which the present application relates to is not necessarily a physical keyboard, for example, the information processing method of the present application may be also applied to a soft keyboard displayed on the Tablet computer.

The information processing method 200 according to the second embodiment of the present application comprises:

step S201: detecting an operation performed via a keyboard;

step S202: determining which keys on the keyboard the operation is addressed to, the keys including ordinary keys, a first dedicated key, and a second dedicated key, wherein when the second dedicated key and each of the ordinary keys are simultaneously operated, a predetermined function corresponding to an associated ordinary key is performed, respectively;

step S203: when a determination result indicates that the operation includes an operation addressed to the first dedicated key and one of the ordinary keys, a predetermined function executed corresponding to that the second dedicated key and the ordinary key are simultaneously operated is executed;

step S204; when the determination result indicates that the operation includes an operation addressed to an ordinary key and the second dedicated key, a predetermined function executed corresponding to that the second dedicated key and the ordinary key are operated simultaneously is executed;

step S205: when the determination result indicates that the operation includes an operation addressed to a function key with predetermined definitions and the first dedicated key, a function corresponding to the function key is executed; and step S206: when the determination result indicates that the operation includes an operation addressed to the function keys with predetermined definitions and the second dedicated key, a function corresponding to that the first dedicated key and each function key are operated simultaneously, i.e., a function corresponding to the function key, is executed.

Steps S201 to S204 in this embodiment are essentially the same as steps S101 to S104 in the first embodiment, details are omitted here.

Next, steps S205 and S206 are mainly described.

In step S205, when the determination result indicates that the operation includes an operation addressed to a function key with predetermined definition and the first dedicated key, a function corresponding to the function key is executed.

For example, when the determination result indicates that the operation includes an operation addressed to the first dedicated key Fn and a function key F8, a function corresponding to the function key F8 is executed.

In addition, in step S206, when the determination result indicates that the operation includes an operation addressed to the function keys with predetermined definitions and the second dedicated key, a function corresponding to that the first dedicated key and each function key are operated simultaneously, i.e., a function corresponding to the function key, is executed.

For example, when the determination result indicates that the operation is a combination operation addressed to the second dedicated key Ctrl and the function key F8, because the combination operation of the second dedicated key Ctrl and the function key F8 cannot execute the predetermined function corresponding to the function key F8, thus it can be thereby determined that this operation of the user is a mis-operation. That is to say, it can be determined that the operation that the user intends to perform is a combination operation of the first dedicated key (i.e., Fn key) and the function key F8. In this case, function of the first dedicated Fn and that of the second dedicated key Ctrl are automatically switched, thus the combination operation of the first dedicated key Fn and the function key F8 is performed, thereby executing the function corresponding to the function key F8.

Accordingly, the information processing method according to the second embodiment of the present application is capable of, based on combination of respective keys operated by the users when making an input, adaptively adjusting functions of the dedicated function keys for proper input, thereby providing user experience.

Third Embodiment

Figure 4:
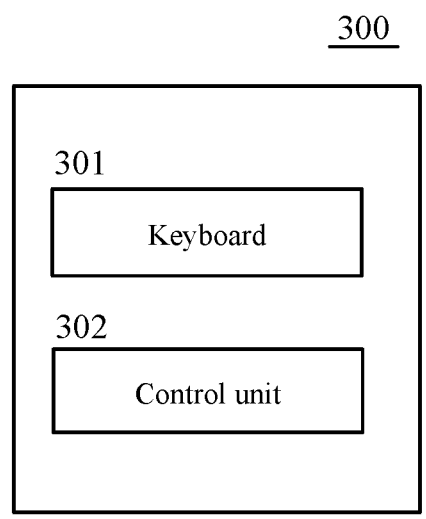
FIG. 4 is a functional configuration block diagram of an electronic device according to a third embodiment of the present application.

Hereinafter, an electronic device according to a third embodiment of the present application will be described with reference to FIG. 4.

The electronic device 300 according to the third embodiment of the present application comprises:

a keyboard 301 on which a plurality of keys are provided, the plurality of keys including ordinary keys, a first dedicated key, and a second dedicated key, wherein when the second dedicated key and each of the ordinary keys are simultaneously operated, a predetermined function corresponding to an associated ordinary key is performed, respectively; and a control unit 302 configured to detect an operation performed via the keyboard, determine which keys on the keyboard the operation is addressed to, and when a determination result indicates that the operation includes an operation addressed to the first dedicated key and an operation addressed to one of the ordinary keys, execute a predetermined function corresponding to that the second dedicated key and the ordinary key are simultaneously operated.

The keyboard further includes function keys with predetermined definitions, when the first dedicated key and each of the function keys are simultaneously operated, a predetermined function corresponding to an associated function key is executed, respectively.

The control unit is further configured to: when the determination result indicates that the operation includes an operation addressed to a function key with predetermined definitions and the first dedicated key, execute a function corresponding to the function key.

The control unit is further configured to: when the determination result indicates that the operation includes an operation addressed to the function keys with predetermined definitions and the second dedicated key, execute a function corresponding to that the first dedicated key and each function key are operated simultaneously, i.e., a function corresponding to the function key.

The control unit is further configured to: when the determination result indicates that the operation includes an operation addressed to an ordinary key and the second dedicated key, execute a predetermined function executed corresponding to that the second dedicated key and the ordinary key are operated simultaneously.

The first dedicated key may be a Fn key on the keyboard, and the second dedicated key may be a Ctrl key.

The keyboard may be a soft keyboard.

Accordingly, the electronic device according to the third embodiment of the present application are capable of, based on combination of respective keys operated by the users when making an input, adaptively adjusting functions of the dedicated function keys for proper input, thereby providing user experience.

It should be noted that, when the electronic device according to respective embodiments are illustrated, only functional units thereof are shown, connection relationship among respective functional units are not specifically described, as will be appreciated by a person skilled in the art, the respective functional units may be properly connected via a bus, an internal wiring, etc., such connection is well known to a person skilled in the art.

It should be noted that, in this specification, the terms "comprise", "include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment. In the case that there is no further limitation, elements defined by the expressions "comprise one . . . " do not exclude there being additional identical elements in the procedure, method, product or equipment of the elements.

Finally, it should be noted that, the above-described series of processings do not only comprise processings executed chronologically in the order mentioned here, and also comprise processings executed in parallel or individually but not chronologically.

Through the above description of the implementations, a person skilled in the art can clearly understand that the present application may be implemented in a manner of software plus a necessary hardware platform, and of course the present application may also be implemented fully by hardware. Based on such understanding, the technical solutions of the present application that contribute to the background art may be embodied in whole or in part in the form of a software product. The computer software product may be stored in a storage medium, such as ROM/RAM, disk, CD-ROM, and include several instructions for causing a computer apparatus (which may be a personal computer, a server, or a network device and so on) to perform the method described in the various embodiments of the present application or certain parts thereof.

Although the present application has been described in detail in the above, specific examples are applied in this text to demonstrate the principles and implementations of the present application, these descriptions of the above embodiments are only to help understand the method of the present application and its core concept. Meanwhile, for a person with ordinary skill in the art, depending on the concepts of the present application, modifications may be made to the specific implementations and applications. To sum up, contents of this specification should not be construed as limiting the present application.

The invention claimed is:

1. An information processing method comprising:
    detecting an operation performed via a keyboard, the keyboard comprising a first keyboard layout;
    determining which keys on the keyboard the operation is addressed to, the keys comprising ordinary keys, a first dedicated key, and a second dedicated key, the ordinary keys comprising alpha-numeric indicia keys, wherein the first dedicated key and the second dedicated key being adjacently disposed on the keyboard;
    the first dedicated key is disposed in a first position in the first keyboard layout, the second dedicated key is disposed in a second position in the first keyboard layout, wherein when the second dedicated key and each of the ordinary keys are simultaneously operated, a predetermined function corresponding to an associated ordinary key is performed, respectively, and wherein the first dedicated key is a Fn key on the keyboard, and the second dedicated key is a Ctrl key on the keyboard;
    when a determination result indicates that the operation includes an operation addressed to the first dedicated key at the first position and one of the ordinary keys and a predetermined function corresponding to the one of the ordinary keys cannot be performed and determines the operation is an operation intended to address to the second dedicated key at the first position and the one of the ordinary keys in a second keyboard layout, wherein the first dedicated key is disposed in the second position in the second keyboard layout, the second dedicated key is disposed in the first position in the second keyboard layout, and then a predetermined function, corresponding to the second dedicated key and the one of the ordinary keys being simultaneously operated, is automatically executed,
    when the determination result indicates that the operation is addressed to the second dedicated key and the ordinary keys, then a predetermined function, corresponding to the second dedicated key and the one of the ordinary keys being simultaneously operated, is executed.

2. The method according to claim 1, wherein the keyboard further includes function keys with predetermined definitions, when the first dedicated key and each of the function keys are simultaneously operated, a predetermined function corresponding to an associated function key is executed, respectively, the method further comprising when the determination result indicates that the operation includes an operation addressed to a function key with predetermined definition and the first dedicated key, a function corresponding to the function key is executed.

3. The method according to claim 2, further comprising when the determination result indicates that the operation includes an operation addressed to the function key with predetermined definition and the second dedicated key, a function corresponding to the operated function key when the first dedicated key and the function key are operated simultaneously is executed.

4. The method as claimed in claim 1, further comprising when the determination result indicates that the operation includes an operation addressed to an ordinary key and the second dedicated key, a predetermined function executed corresponding to that the second dedicated key and the ordinary key are operated simultaneously is executed.

5. The method according to claim 1, wherein the keyboard is a soft keyboard.

6. An electronic device, comprising:
    a keyboard on which a plurality of keys are provided, the plurality of keys comprising ordinary keys, a first dedicated key, and a second dedicated key, the ordinary keys comprising alpha-numeric indicia keys, the keyboard comprising a first keyboard layout, wherein the first dedicated key and the second dedicated key being adjacently disposed on the keyboard, the first dedicated key is disposed in a first position in the first keyboard layout, when the second dedicated key and each of the ordinary keys are simultaneously operated, a predetermined function corresponding to an associated ordinary key is performed, respectively, and wherein the first dedicated key is a Fn key on the keyboard, and the second dedicated key is a Ctrl key on the keyboard; and
    a control unit configured to detect an operation performed via the keyboard, determine which keys on the keyboard the operation is addressed to, and when a determination result indicates that the operation includes an operation addressed to the first dedicated key at the first position and one of the ordinary keys and a predetermined function corresponding to the one of the ordinary keys cannot be performed and determines the operation is an operation intended to address to the second dedicated key at the first position and the one of the ordinary keys in a second keyboard layout, wherein the first dedicated key is disposed in the second position in the second board keyboard layout, the second dedicated key is disposed in the first position in the second keyboard layout, wherein a predetermined function, corresponding to the second dedicated key and the one of the ordinary keys being simultaneously operated, is automatically executed, when the determination result indicates that the operation is addressed to the second dedicated key and the ordinary keys, and then a predetermined function, corresponding to the second dedicated key and the one of the ordinary keys being simultaneously operated, is executed.

7. The electronic device according to claim 6, wherein the keyboard further includes function keys with predetermined definitions, when the first dedicated key and each of the function keys are simultaneously operated, a predetermined function corresponding to an associated function key is executed, respectively, and the control unit is further configured to: when the determination result indicates that the operation includes an operation addressed to a function key with predetermined definition and the first dedicated key, execute a function corresponding to the function key.

8. The electronic device according to claim 7, wherein the control unit is further configured to, when the determination result indicates that the operation includes an operation addressed to the function key with predetermined definition and the second dedicated key, execute a function corresponding to the operated function key when the first dedicated key and the function key are operated simultaneously.

9. The electronic device according to claim 8, wherein the control unit is further configured to, when the determination result indicates that the operation includes an operation addressed to an ordinary key and the second dedicated key, execute a predetermined function executed corresponding to that the second dedicated key and the ordinary key are operated simultaneously.

10. The electronic device according to claim 6, wherein the keyboard is a soft keyboard.

* * * * *